United States Patent
Wood

[19]

[11] Patent Number: 6,163,850
[45] Date of Patent: Dec. 19, 2000

[54] METHOD OF SELECTING BETWEEN MULTIPLE CLOCK DRIVE SOURCES FOR A BACKPLANE CLOCK SIGNAL

[75] Inventor: Robert Geoffrey Wood, Ottawa, Canada

[73] Assignee: Mitel Corporation, Ontario, Canada

[21] Appl. No.: 09/193,745

[22] Filed: Nov. 17, 1998

Related U.S. Application Data

[60] Provisional application No. 60/066,080, Nov. 17, 1997.

[30] Foreign Application Priority Data

Nov. 17, 1997 [GB] United Kingdom .................. 9724256

[51] Int. Cl.$^7$ ....................................................... G06F 1/04
[52] U.S. Cl. .............................................................. 713/500
[58] Field of Search ..................................... 713/500, 600, 713/601; 714/1, 2, 3, 5, 7

[56] References Cited

U.S. PATENT DOCUMENTS 3,803,568  4/1974  Higashide .
5,058,132  10/1991  Li ............................................. 375/260

*Primary Examiner*—Thomas M. Heckler
*Attorney, Agent, or Firm*—Keating & Bennett, LLP

[57] ABSTRACT

A shared bus system comprising multiple cards (10, 12, 14) containing clock sources (16) connected to at least one bus system (18), and transferring circuitry (22, 28) for disturbance-free transferring of control of a backplane clock signal between said cards.

7 Claims, 5 Drawing Sheets

METHOD OF SELECTING BETWEEN MULTIPLE CLOCK DRIVE SOURCES FOR A BACKPLANE CLOCK SIGNAL

This application claims benefit of Provisional No. 60/066,080 filed Nov. 17, 1997.

FIELD OF THE INVENTION

This invention relates in general to shared bus systems and more specifically to a system of backplane clock signal drivers installed in circuit cards connected to the backplane of a shared bus system wherein the switching of the drivers does not cause any interruptions in operation of the circuit cards.

BACKGROUND OF THE INVENTION

It is well known in the art of shared bus systems, such as the Mitel® Open Telephony Platform System, that a backplane clock signal may be driven by any circuit card installed in the backplane of the system. In most cases, more than one installed card may be capable of driving the clock signal. Moreover, it may be necessary to transfer control of the backplane clock signal from a first card to a second card while the shared bus system is operational. This necessitates an interruption-free handover of control of the clock signal from the first card driving the clock signal to the second card.

SUMMARY OF THE INVENTION

The invention allows for switching from a first card driving the backplane clock signal to a second card driving the backplane clock signal without causing a disturbance, or interruption, to the signal, thus allowing such switching to be done while the shared bus system is operational and with no adverse effects.

The switching is controlled by a controlling card within the system which broadcasts a message onto the backplane via backplane messaging signals. The message is addressed to the above-mentioned second card (i.e. the card which is expected to drive the backplane clock signal). The card which is currently driving the bus is also notified of this message. In a synchronized manner, the driving card, the above-mentioned first card, deasserts its enable signal and the addressed card, the above-mentioned second card, asserts its enable signal thus taking over the function of driving the backplane clock signal.

BRIEF DESCRIPTION OF THE DRAWINGS

An embodiment of the invention is described below with reference to the accompanying drawings, in which.

DETAILED DESCRIPTION OF THE PREFERRED EMBODIMENT

In the preferred embodiment, a serial, high-level data link control (HDLC) based messaging system is implemented in a shared bus architecture, such as the MITEL® Open Telephony Platform System. It should be noted that the inventive principles apply equally to a parallel bus messaging system. It should be further noted that such a parallel bus based system is a variation upon the system set forth herein.

Figure 1:
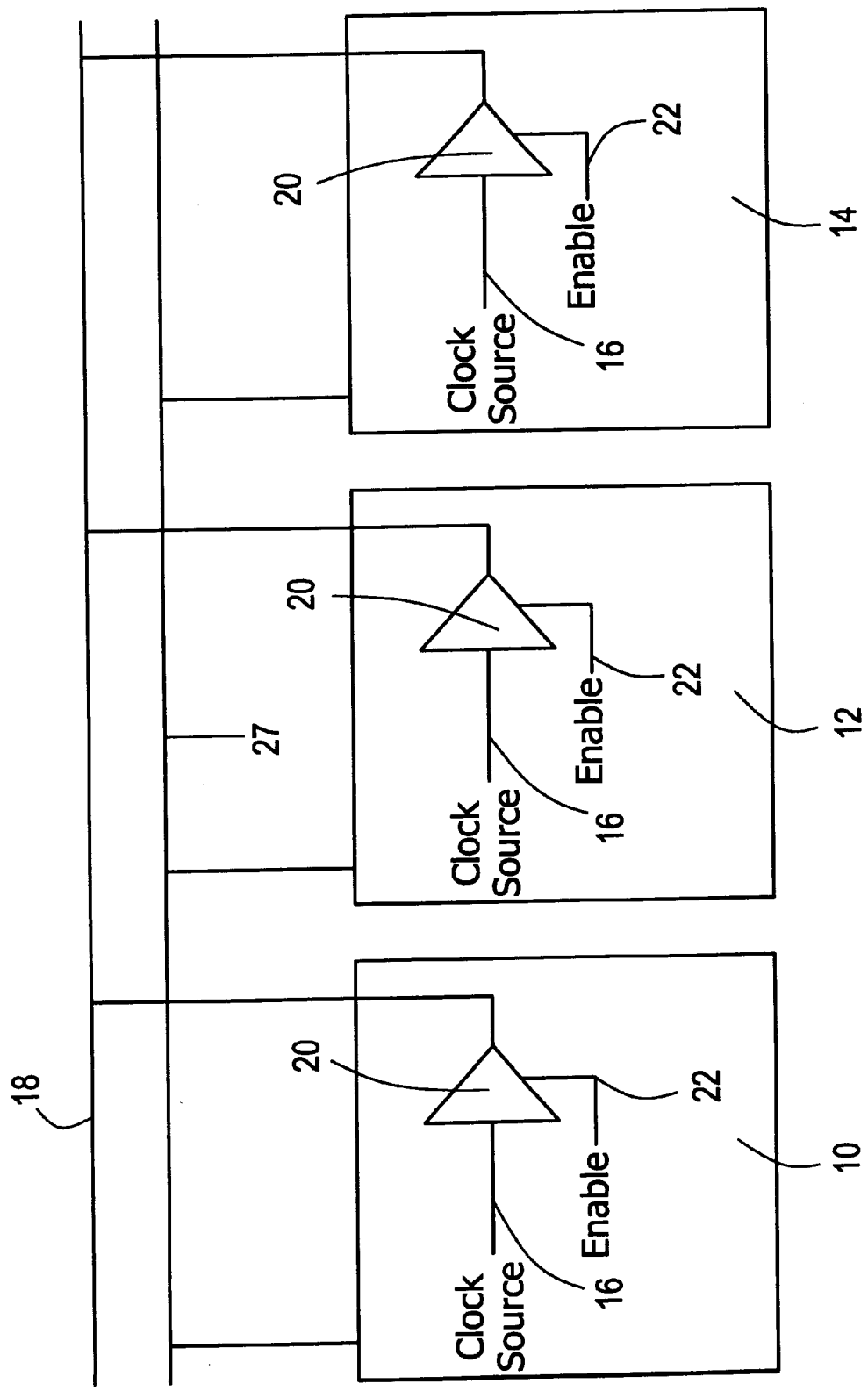
FIG. 1 is a diagram of a shared bus system.

Turning to FIG. 1, a shared bus system is shown containing three circuit cards 10, 12, and 14. Each card 10, 12 and 14 has an individual clock source 16 which is connected to a backplane clock signal 18 via individual tri-state drivers 20. Each tri-state driver 20 contains an enable signal 22 which, when asserted, causes the driver 20 to drive the backplane clock signal 18 using its clock source 16. Thus if card 10 is driving the backplane signal 18, the driver 20 corresponding to card 10 is enabled and the drivers 20 corresponding to cards 12 and 14 are disabled.

Figure 2:
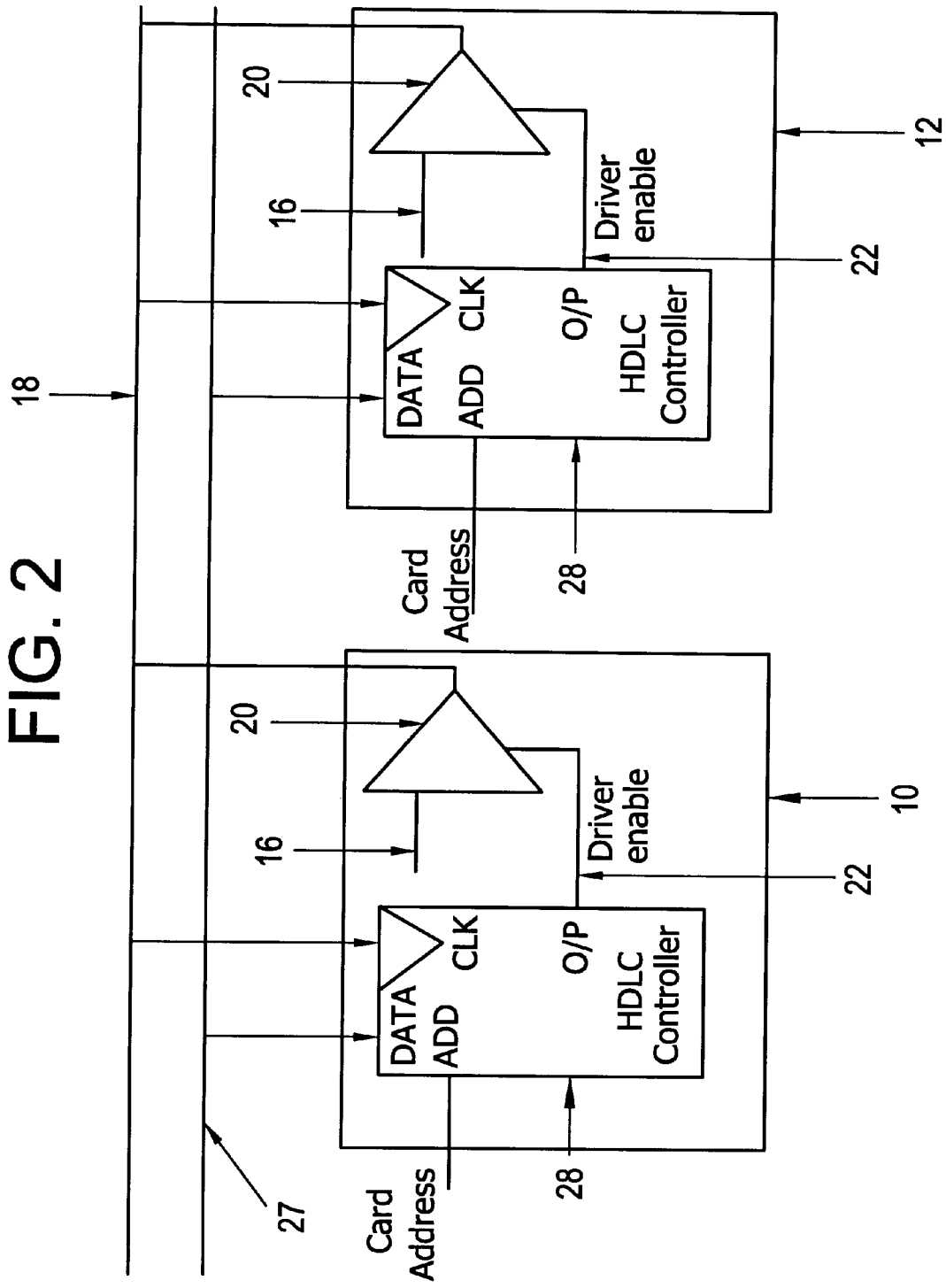
FIG. 2 shows a system of backplane clock signal drivers in accordance with the present invention for driving clock signals on the shared bus system of FIG. 1.

Turning to FIG. 2, an Open Telephony Platform System, which is the preferred operating environment of the present invention, is shown. Although only two cards 10 and 12 are shown in the figure, in a normal bus system many more cards, similar to 10 and 12, are present. In the Open Telephony Platform System, control messages are transmitted to cards 10 and 12 via a predetermined 64 kB/s channel 27 located on the backplane. The control messages are used to inform the cards 10 and 12 of a change in backplane clock control. The control messages are sent via HDLC protocol with a unique address for identifying the card 10 or 12 which is to take over control of the backplane clock signal 18. Unique addresses are assigned to each card 10 and 12 to act as identifiers for the control message so that the control message is delivered correctly. A separate HDLC control block 28 is included in each card 10 and 12 for selecting and decoding the control messages passed through the channel 27. Only the card 10 or 12, whose address matches the address located in the HDLC message address section, decodes, interprets and executes the control message while the other cards simply decode the control message. The control message consists of a Clock_Drive_Switch command which informs the above-mentioned first and second cards of the upcoming change of control of the backplane clock signal 18. Depending on the individual card 10 or 12, the Clock_Drive_Switch command causes different actions. For instance, if the address located in the HDLC control message address section is the unique address of card 10 and is not the unique address of card 12, the driver 20 corresponding to card 12 is disabled and the driver 20 corresponding to card 10 is enabled.

Figure 3A:
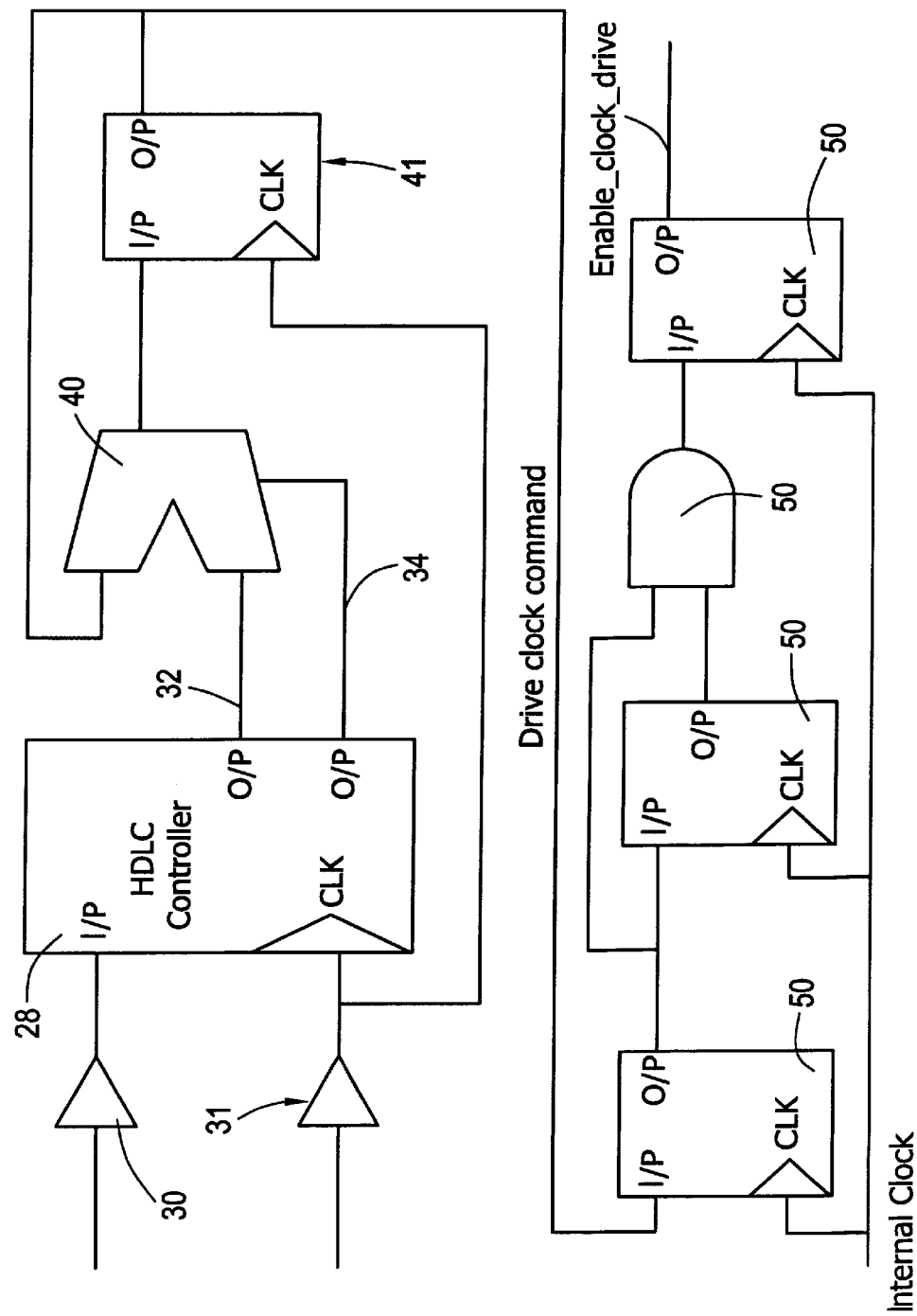
FIGS. 3A, 3B are schematic diagrams which, in conjunction with one another, show circuitry for implementing the system according to the preferred embodiment.
Figure 3B:
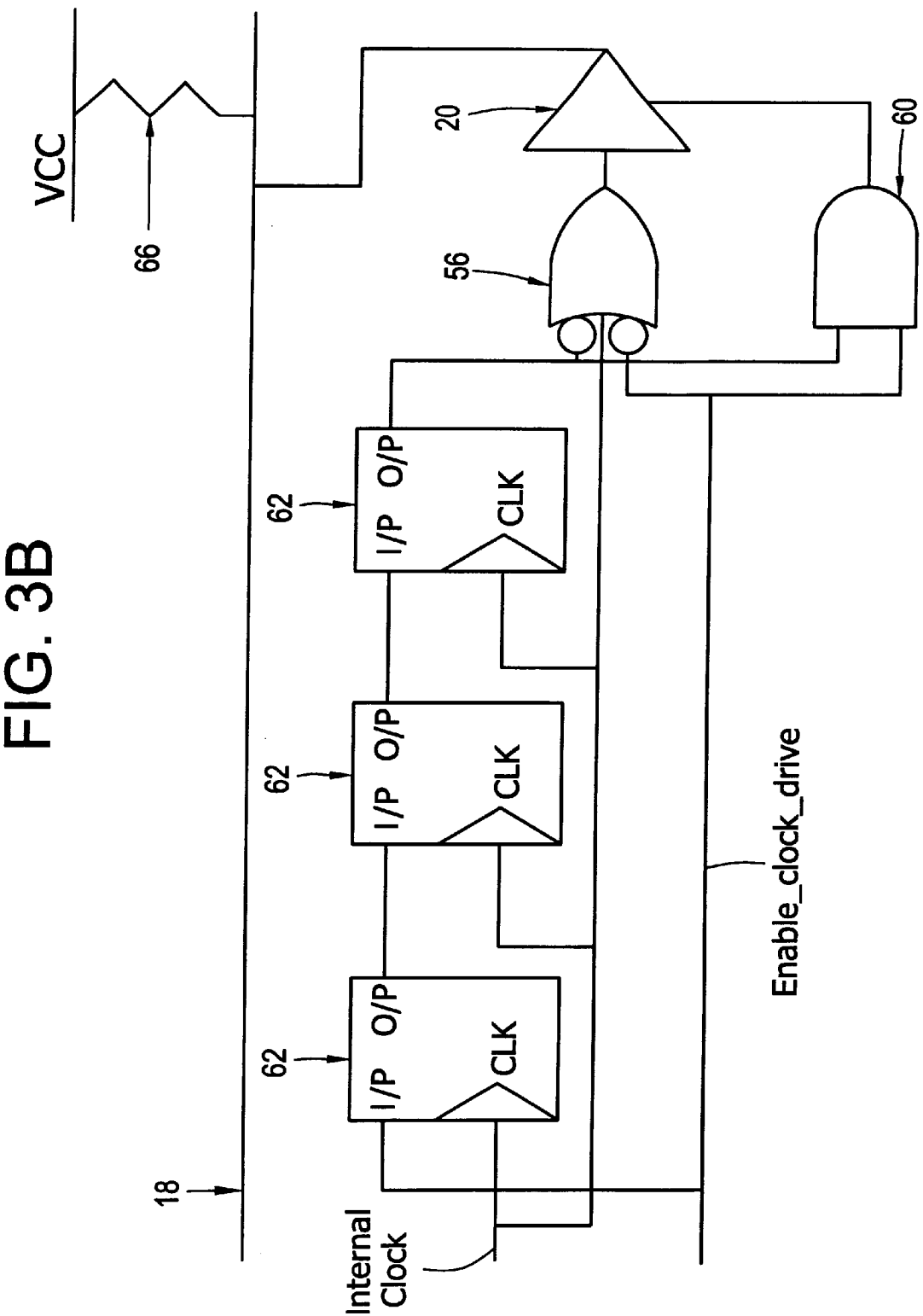
Figure 3C:
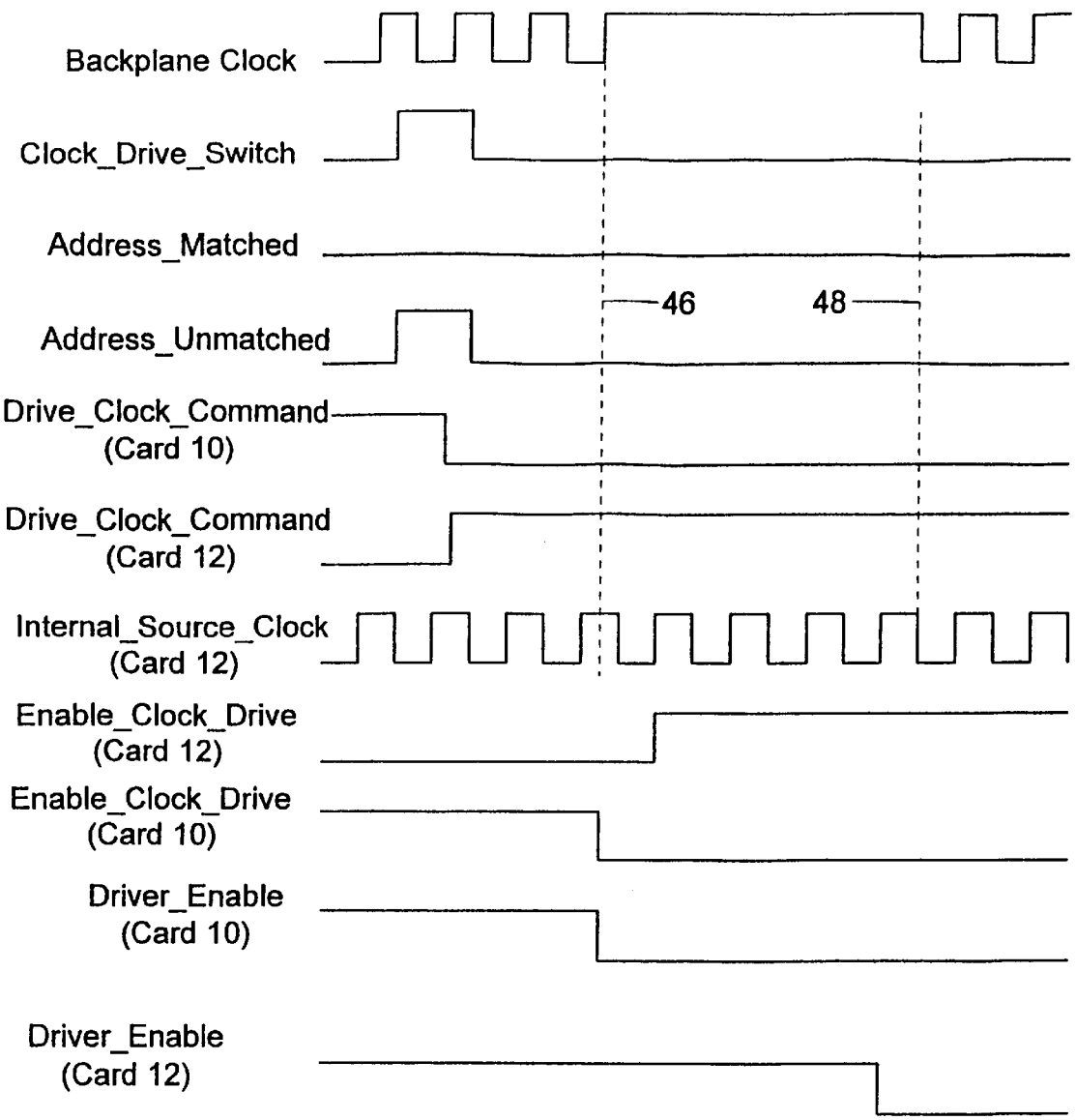
FIG. 3C is a timing diagram showing signals produced during operation of the preferred embodiment of the present invention.

Turning to FIGS. 3A, 3B and 3C, details are shown of a circuit for transferring the clock driving function from a first card 10 to a second card 12 along with a timing diagram showing signals produced during the transferring of the clock driving function.

In the preferred embodiment, the address located in the HDLC control message address section is assumed to be the unique address of card 12.

Backplane control message signals, transmitted by the channel 27, and the backplane clock signal 18 are sent to the HDLC control block 28 located on each card 10 or 12 via input buffers 30 and 31 respectively. The HDLC control block 28, which is driven by the backplane clock signal 18, produces two pulsed signals 32 and 34. The first signal 32 is an address decode signal. The second signal 34 represents the Clock_Drive_Switch command and is generated from the decoding of the control message.

The signal 32 of the addressed card 12 is an Address_Matched signal (shown in FIG. 3C) while the signal 32 of the unaddressed card 10 is an Address_Unmatched signal (shown in FIG. 3C). A mux 40 and a flip-flop 41, located on the cards 10 and 12, latches the signal 32 and produces an output signal labeled Drive_Clock_Command. This output signal is fed back into the mux 40 as well as into a series of flip-flops 50 discussed herein below. The output Drive_Clock_Command signals for the addressed card 12 and the unaddressed card 10 are shown in FIG. 3C and labeled as Drive_Clock_Command (Card 12) and Drive_Clock_Command (Card 10) respectively.

Reference line 46 in FIG. 3C indicates the end of control of the backplane clock signal 18 for card 10 and shows that the backplane signal 18 has no phase relationship to the internal clock source 16 of the addressed card 12 prior to the outputting of the Drive_Clock_Command (Card 12) signal.

Reference line 48 in FIG. 3C indicates the beginning of control of the backplane clock signal 18 for the addressed card 12 and shows that a phase relationship exists between the backplane clock signal 18 and the internal clock source 16 of the addressed card 12 after outputting the Drive_Clock_Command (Card 12) signal.

In order to synchronize the Drive_Clock_Command (Card 12) and Drive_Clock_Command (Card 10) signals to the internal clocks 16 of the addressed card 12 and unaddressed card 10 respectively, flip-flops 50 must be used. The signal output from the flip-flops 50 (labeled as Enable_Clock_Drive in FIG. 3B) for the addressed card 12 and the unaddressed card 10 are shown in FIG. 3C as Enable_Clock_Drive (Card 12) and Enable_Clock_Drive (Card 10) respectively.

When the Enable_Clock_Drive (Card 10) signal is deasserted for card 10, the backplane clock signal 18 changes to a logic high through the action of an OR gate 56 and a Driver_Enable signal is deasserted through the action of an AND gate 60. The Driver_Enable signal for card 10 is shown in FIG. 3C and labeled as Driver_Enable (Card 10). The deassertion of the Enable_Clock_Drive (Card 10) signal also results in the backplane clock signal 18 being driven to a high state and causes the driver 20 corresponding to card 10 to operate in a high impedance mode. Subsequently, card 10 ceases to drive the backplane clock signal 18. A pull-up resistor 66 is also provided to pull up the backplane clock signal 18 to a voltage high.

Flip flops 62 supply a delay (a minimum of three clock delays is necessary for the preferred embodiment) between the termination of the control of the backplane clock 18 by card 10 to enabling of control of the backplane clock 18 by card 12. The OR gate 56 and the AND gate 60 ensures that this occurs by asserting and deasserting the drivers 20. The combination of the OR gate 56 and the AND gate 60 provide the most basic logic function. Provided that the logic function is the same, any combination of logic gates may be substituted for the OR gate 56 and the AND gate 60.

After the Driver_Enable signal for card 12 (shown as Driver_Enable_12 in FIG. 3C) is asserted, the tri-state buffer driver 20 corresponding to card 12 commences driving the backplane clock signal 18. Simultaneously, the internal clock source 16 of card 12 is in a high clock phase and the backplane signal 18 is not driven low until the first low phase at reference line 48 of FIG. 3C.

Operation of flip flops 62 ensures that the backplane clock 18 runs interruption free due to the time delay created by the flip flops 62. When control of the backplane clock signal 18 switches, the backplane clock signal 18 goes through an extended high clock phase between reference lines 46 and 48 (in the timing diagram of FIG. 3C) but which does not disturb any phase locked loops or synchronous circuits being driven by the backplane clock signal 18.

The backplane clock signal 18 and the internal clock source 16 for the addressed card 12 are shown in FIG. 3C as a reference for the other signals.

It will be appreciated that, although only one embodiment of the invention has been described and illustrated in detail, various changes and modification may be made. One such modification relates to the selection of the driver 20. In the preferred embodiment of the present invention, a tri-state buffer driver is disclosed but may be replaced by an open-collector or open-drain technology driver. The difference in implementation involves the addition of a NAND gate (prior to the driver 20) with the source clock signal 16 and the enable signal 22 as inputs to the NAND gate. Another modification is that although a serial, HDLC based messaging system has been described in the preferred embodiment, the same system may be applied to a parallel bus messaging system. A third modification is that the messages need not be HDLC encoded but can be unencoded. A fourth possible modification is that a different number of delays may be inserted between the reference lines 46 and 48 of FIG. 3C. Also, the logic function produced by the OR gate 56 and the AND gate 60 may be substituted for any other logic types as long as the function does not change. A final modification is in the addressed control message command which is decoded by all the cards. The command may be a broadcast command with the address of the new driver incorporated as a field within the command. All such changes and modifications may be made without departing from the sphere and scope of the invention as defined by the claims appended herein.

What is claimed is:

1. A method of providing interruption-free transition between two separate clock driving sources within a shared bus system comprising the steps of:
   a) creating and sending a control message to a plurality of cards containing clock driving sources within said shared bus system for informing a first and second of said cards of a transfer of control of a backplane clock signal from said first card to said second card;
   b) decoding said message within each of said cards;
   c) disabling of clock driving sources in all but said second card;
   d) decoding, interpreting and executing of said control message by said second card; and
   e) synchronously deasserting said first card and asserting said second card to transfer control of said backplane clock signal from said first card to said second card.

2. A shared bus system comprising:
   multiple cards containing clock driving sources connected to at least one bus system;
   means for creating and sending a control message to said cards containing clock driving sources within said shared bus system for informing a first and second of said multiple cards of a transfer of control of a backplane clock signal from said first card to said second card;
   means for decoding said control message within each of said cards;
   means for disabling of clock driving sources in all but said second card;
   means for decoding, interpreting and executing of said control message by said second card; and
   means for synchronously deasserting said first card and asserting said second card to transfer control of said backplane clock signal from said first card to said second card.

3. The shared bus system of claim 2 wherein said cards further comprise:

an address decoder for decoding an address located in an address section of a control message;

a message decoder to decode a message within said control message; and a driver to enable said clock source used to drive a backplane clock signal when control of said backplane clock signal has been transferred to said card by informing said card through said message within said control message and to disable said clock source when control of said backplane signal has been removed from said card by informing said card through said message within said control message.

4. The shared bus system of claim 3 wherein said control messages are transmitted via a 64 kB/s channel.

5. The shared bus system of claim 3 wherein said address decoder is HDLC based.

6. The shared bus system of claim 3 wherein said message decoder is HDLC based.

7. The shared bus system of claim 3 wherein said driver is one of a tri-state buffer driver, an open-collector technology driver or an open-drain technology driver.

* * * * *